BEST AVAILABLE COPY

2 Sheets—Sheet 1.

BEST AVAILABLE COPY

D. M. HOLMES.
Cake-Machine.

No. 9,062. Reissued Feb. 3, 1880.

BEST AVAILABLE COPY

WITNESSES:
C. Neveux
C. Sedgwick

INVENTOR:
D. M. Holmes
BY Munn & Co
ATTORNEYS.

D. M. HOLMES.

Cake-Machine.

No. 9,062. Reissued Feb. 3, 1880.

BEST AVAILABLE COPY

WITNESSES:

C. Neveux

E. Sulgwick

INVENTOR:

D. M. Holmes

BY Munn & Co.

ATTORNEYS.

BEST AVAILABLE COPY

JNITED STATES PATENT OFFICE.

DANIEL M. HOLMES, OF NEW YORK, N. Y.

CAKE-MACHINE.

FICATION forming part of Reissued Letters Patent No. 9,062, dated February 3, 1880.

Original No. 174,244, dated February 29, 1876. Application for Reissue filed May 16, 1879.

*whom it may concern:*

Figure 1:
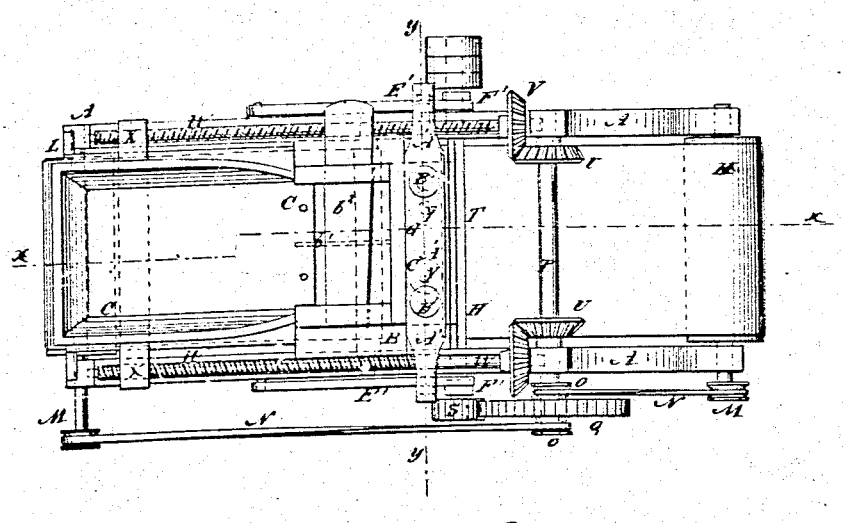
Figure 2:
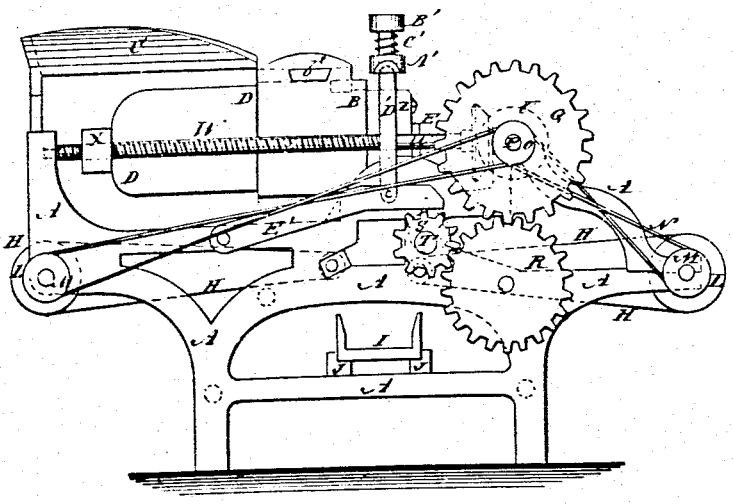
Figure 3:
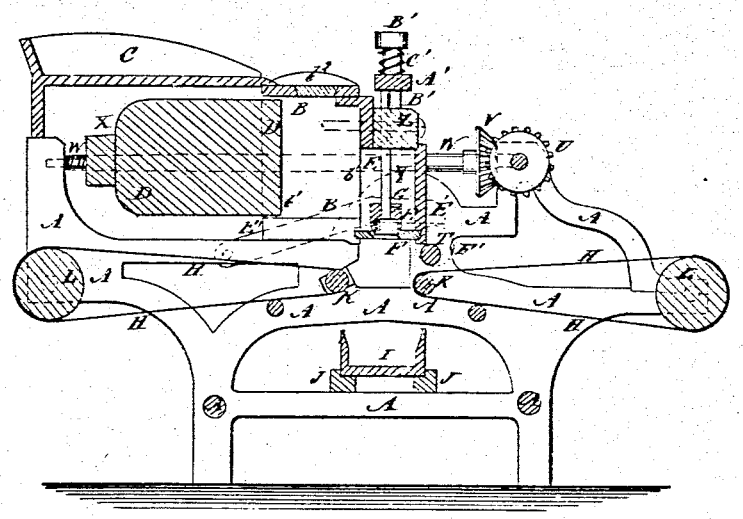
Figure 4:
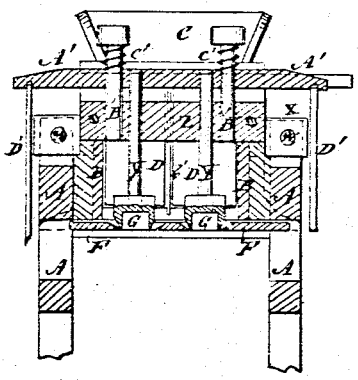
Figure 5:
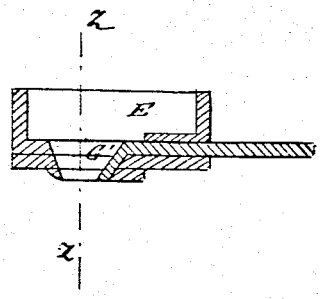

: known that I, DANIEL M. HOLMES, of y, county, and State of New York, have ed a new and useful Improvement in lachines, of which the following is a cation.

ure 1, Sheet 1, is a top view of my im- l machine. Fig. 2, Sheet 1, is a side of the same. Fig. 3, Sheet 2, is a verti- ngitudinal section of the same, taken gh the line *x x*, Fig. 1. Fig. 4, Sheet 2, ertical cross-section of the same, taken gh the line *y y*, Fig. 1. Fig. 5, Sheet 2, letail section of a modification of the Fig. 6, Sheet 2, is a detail cross-section through the line *z z*, Fig. 5.

ilar letters of reference indicate corre- ding parts.

e object of this invention is to furnish an oved machine for making cakes, such as les, kisses, drops, macaroons, &c., of h so soft that heretofore it could be ed only by hand, and which shall be sim- construction and convenient in use.

is machine is for giving form to dough for ng cakes, such as jumbles, kisses, drops, roons, &c.

eretofore the difficulty experienced in the npt to construct a suitable machine for purpose has been the soft and adhesive re of the dough, so that cakes of the ses named have been almost altogether e by hand.

he construction and arrangement of the eral parts of the machine are as follows:

is the frame of the machine, to the upper dle part of which is attached the dough- B, into the open top of which the dough ed from a hopper, C, attached to the rear t of the frame A.

he dough-box B is divided into as many partments as there are discharge-openings thin vertical partitions *b'*, and into each apartment is fitted a plunger, D, which en- s through the rear side of the said dough- x.

The object of this construction is this: The ugh is soft and must be discharged down- rd. If the plungers worked vertically, they uld have to be raised to a considerable dis- ice before the dough could be put into the dough-box, which would cause a great loss of time in working the machine. When the plungers work horizontally the top of the dough-box can be opened and the dough can be put in while the plungers are receding, so that the plungers need be drawn back no farther than to give space for the charge, and hence no time is lost.

The open top of the dough-box B is closed with a sliding cover, *b²*, to prevent the dough from being pushed out of said open top by the action of the plungers D.

Upon the lower forward side of the dough-box B is formed an extension, E, the bottom of which is at a lower level than the bottom of the main part of the dough-box.

The bottom F of the extension or offset E of the dough-box B slides in and out in grooves in the sides of said extension, so that it can be taken out and exchanged for a plate with larger or smaller openings when desired, and in it are formed one, two, or more round holes, which are beveled off or made conical, as shown in Figs. 3 and 4.

G are the ring-cutters, which are made in the shape of hollow cylinders with closed upper ends, and with the outer sides of their edges beveled off with a longer bevel than the bevel of the holes through the bottom or cutter plates, F, so that when the cutters G are forced down their extreme edges may come in contact with the extreme edges of the holes in the cutter-plate F and separate or pinch off the dough.

The cutters G are never raised entirely out of the holes in the bottom plate, F, so that when the dough is pressed down and out by the advance of the plungers D it passes out upon all sides of the cutters G, is pinched off by the descent of the cutters G, and drops as a ring upon the pans placed beneath the bottom plate, F, upon the endless carriers H, which are placed in line with each other and at a little distance apart.

The object of thus separating the carriers is this: The first cakes dropped from the plate F are incomplete, or not so well formed as those subsequently made when the pressure of the plunger has compacted the dough. It is, of course, not desired to bake these incompletely-formed cakes, nor that they shall be

BEST AVAILABLE COPY allowed to drop on the carriers H, and hence they are not received into the baking-pans which travel on the carriers H, but drop between the ends of such carriers into a separate pan, I; which is slid under the machine on rabbeted bars J. The carriers are sufficiently near each other to allow the baking-pans to pass from one onto the other. The carrier-aprons pass around rollers K and L, and the latter are connected with shaft P by belts N, passing around pulleys M and O.

The shaft P revolves in bearings attached to the upper forward part of the frame A.

To the end of the shaft P is attached a large gear-wheel, Q, into the teeth of which mesh the teeth of a large intermediate gear wheel, R.

The gear-wheel R revolves upon a gudgeon attached to the frame A, and into its teeth mesh the teeth of a small gear-wheel, S, attached to the end of the driving-shaft T, which revolves in bearings attached to the frame A, and to its other end are attached the pulleys to receive the driving-belt.

To the end parts of the shaft P are attached two bevel-gear wheels, U, the teeth of which mesh into the bevel-gear wheels V, attached to the forward ends of the screws W, which are swiveled to the frame A, and pass through screw-holes in the end parts of the cross-bar X, attached to the rear ends of the plungers D, so that the said plungers may be forced forward with a steady and uniform movement while the machine is at work.

The cutters G are attached to the lower ends of rods Y, the upper ends of which pass up through the block Z, attached to the dough-box B, in the angle between the upper part of said dough-box and its extension E, and their upper ends are attached to the cross-bar A′.

The cross-bar A′ moves up and down upon guide-pins B′, attached to the block Z, and is forced down to cause the cutters G to make a cut by the spiral springs C′, placed upon the upper part of the guide-pins B′. The upper ends of the springs C′ rest against the heads of the pins B′, and their lower ends rest against the cross-bar A′.

The block Z is detachable, so that it may be detached and exchanged for another with larger or smaller or with different shaped cutters when desired.

The ends of the cross-bar A′, project and are recessed upon their lower sides to receive the upper ends of the push-bars D′, the lower ends of which are pivoted to the levers E′ near their forward ends. The rear ends of the levers E′ are pivoted to the frame A, and their forward ends rest upon the cams F′, formed upon the driving-shaft T, so that the cutters G may be operated at each revolution of the driving-shaft T. The cutters G, as hereinbefore described, are designed for cutting jumbles or other ring-cakes.

Figure 6:
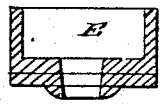

For cutting kisses, drops, macaroons, and other similar cakes without holes through them, there are used sliding beveled cutters G′, pinching off the dough against the beveled side of the discharge-openings in the same manner as the cutters G pinch it off, as shown in Figs. 5 and 6.

Having thus described my invention, I claim as new and desire to secure by Letters Patent—

1. A dough-box, B, made with an extension and offset, E, to receive the cutters and enable them to operate at right angles with the plungers D, substantially as herein shown and described.

2. The combination, with the dough-box extension having apertures in its bottom, through which the dough is discharged vertically, of the plunger D and screws W W for propelling the latter forward horizontally, as shown and described.

3. The combination, with the dough-box extension E, of the block Z, which forms the detachable top of the latter, and the cutters, having rods which pass through said block, as shown and described, for the purpose specified.

4. The combination of the cross bar A′ and its guide-pins B′ and springs C′, the push-bars D′, levers E′, and cams F′ with the detachable head-block Z, the cutters G Y, and the driving-shaft T, substantially as herein shown and described.

5. The combination, with the dough-box, having discharge-apertures, as specified, of the cutters, which are arranged within said dough-box so as to be surrounded or embedded in the dough when at work, substantially as shown and described.

6. The combination, with a plunger and dough-box, of cutters made with beveled edges, and cutter-plates having openings with beveled edges, as shown and described.

7. In a cake-machine, the combination, with the dough-box, of two endless carriers working in line with each other, and with a space or opening between them beneath the discharge-opening of the dough-box, substantially as herein shown and described.

8. The combination, with a dough-box having a circular discharge-opening, of a plunger having a circular periphery, and arranged to reciprocate in relation to said opening so that their circular edges will alternately meet and separate a short distance, thereby allowing the dough to pass between them in the shape of a ring, and then severing the ring thus formed from the mass of dough in the dough-box simultaneously around the entire circle of the periphery of the plunger, substantially as shown and described.

DANIEL M. HOLMES.

Witnesses:
JAMES T. GRAHAM,
C. SEDGWICK.